US010837422B2

(12) United States Patent
Whitfield

(10) Patent No.: US 10,837,422 B2
(45) Date of Patent: Nov. 17, 2020

(54) DUCTED WIND TURBINE AND SUPPORT PLATFORM

(71) Applicant: SEAMACH LTD, Amesbury (GB)

(72) Inventor: Glenn Andrew Hunt Whitfield, Salisbury (GB)

(73) Assignee: Seamach Ltd., Amesbury (GB)

( * ) Notice: Subject to any disclaimer, the term of this patent is extended or adjusted under 35 U.S.C. 154(b) by 0 days.

(21) Appl. No.: 16/342,138

(22) PCT Filed: Oct. 20, 2017

(86) PCT No.: PCT/GB2017/053186
§ 371 (c)(1),
(2) Date: Apr. 15, 2019

(87) PCT Pub. No.: WO2018/073609
PCT Pub. Date: Apr. 26, 2018

(65) Prior Publication Data
US 2019/0257284 A1    Aug. 22, 2019

(30) Foreign Application Priority Data

Oct. 21, 2016 (GB) .................................. 1617803.0

(51) Int. Cl.
*F03D 1/04* (2006.01)
*F03D 9/35* (2016.01)
(Continued)

(52) U.S. Cl.
CPC ................ *F03D 1/04* (2013.01); *B63B 1/107* (2013.01); *B63B 1/125* (2013.01); *B63B 35/44* (2013.01);
(Continued)

(58) Field of Classification Search
CPC ... F03D 1/04; F03D 9/35; F03D 13/25; F03D 7/0204; F03D 9/008; B63B 1/107;
(Continued)

(56) References Cited

U.S. PATENT DOCUMENTS

| 4,154,556 A | * | 5/1979 | Webster | .................... F03D 1/04 |
| | | | | 415/4.4 |
| 2005/0082839 A1 | * | 4/2005 | McCoin | .................. F03D 1/025 |
| | | | | 290/55 |

(Continued)

FOREIGN PATENT DOCUMENTS

| DE | 255518 C | 1/1912 |
| DE | 29617306 U1 | 12/1996 |

(Continued)

OTHER PUBLICATIONS

International Search Report for International Application No. PCT/GB2017/053186, dated Mar. 21, 2018.
(Continued)

*Primary Examiner* — Viet P Nguyen
(74) *Attorney, Agent, or Firm* — Kim IP Law Group PLLC

(57) ABSTRACT

The invention relates to a ducted wind turbine having a turbine rotor assembly which extracts kinetic energy from air flowing there past. The rotor assembly includes a plurality of rotor blades having rotor tips at their outermost ends which define a rotor tip sweep circumference. A duct assembly at least partially surrounds said rotor tip sweep circumference and a base platform supports the ducted wind turbine. The duct assembly is mounted on the base platform by way of a weathervane bearing arrangement such that the duct assembly may weathervane around the turbine rotor assembly in response to changes in wind direction. A semi-submersible support platform, wave energy capture apparatus, torsional bearing mechanism and a latticework
(Continued)

wind turbine tower associated with the ducted wind turbine are also provided.

23 Claims, 18 Drawing Sheets

(51) Int. Cl.
  *F03D 13/25* (2016.01)
  *B63B 1/10* (2006.01)
  *B63B 1/12* (2006.01)
  *B63B 35/44* (2006.01)
  *F03B 13/18* (2006.01)
  *F03B 13/20* (2006.01)
  *F03D 7/02* (2006.01)
  *F03D 9/00* (2016.01)

(52) U.S. Cl.
  CPC .......... *F03B 13/1815* (2013.01); *F03B 13/20* (2013.01); *F03D 7/0204* (2013.01); *F03D 9/008* (2013.01); *F03D 9/35* (2016.05); *F03D 13/25* (2016.05); *B63B 2001/126* (2013.01); *B63B 2001/128* (2013.01); *B63B 2035/446* (2013.01); *F05B 2240/131* (2013.01); *F05B 2240/40* (2013.01); *F05B 2240/50* (2013.01); *F05B 2240/9121* (2013.01); *F05B 2240/93* (2013.01); *Y02E 10/38* (2013.01); *Y02E 10/723* (2013.01); *Y02E 10/727* (2013.01); *Y02E 10/728* (2013.01)

(58) Field of Classification Search
  CPC ..... B63B 1/125; B63B 35/44; F03B 13/1815; F03B 13/20
  See application file for complete search history.

(56) References Cited

U.S. PATENT DOCUMENTS

| | | | |
|---|---|---|---|
| 2008/0296901 A1* | 12/2008 | Liu | F03D 1/04 290/55 |
| 2010/0295314 A1* | 11/2010 | Sohn | F03D 1/02 290/55 |
| 2011/0006539 A1* | 1/2011 | Lefranc | B63B 39/03 290/55 |
| 2011/0175366 A1* | 7/2011 | Steinlechner | F03D 1/065 290/55 |
| 2012/0038157 A1* | 2/2012 | Skala | F03D 1/04 290/44 |
| 2014/0234105 A1* | 8/2014 | Tolo | E04H 12/187 416/85 |
| 2014/0369826 A1* | 12/2014 | Rohring | F03D 1/04 415/207 |
| 2015/0056076 A1* | 2/2015 | Williams | F03D 13/22 416/6 |
| 2016/0084227 A1* | 3/2016 | Krippene | F03D 9/39 290/55 |
| 2018/0017036 A1* | 1/2018 | Steiner | F03D 1/04 |

FOREIGN PATENT DOCUMENTS

| | | |
|---|---|---|
| EP | 2740930 A1 | 6/2014 |
| JP | H09273473 A | 10/1997 |
| NL | 6516544 A | 6/1967 |

OTHER PUBLICATIONS

Written Opinion for International Application No. PCT/GB2017/053186, dated Mar. 21, 2018.
International Preliminary Report on Patentability for International Application No. PCT/GB2017/053186, dated Sep. 20, 2018.

* cited by examiner

DUCTED WIND TURBINE AND SUPPORT PLATFORM

CROSS-REFERENCE TO RELATED APPLICATIONS

This application is a U.S. national phase application under 35 U.S.C. § 371 of International Application No. PCT/GB2017/053186 filed on Oct. 20, 2017, which claims priority to Great Britain application no. 1617803.0 filed on Oct. 21, 2016, the entire disclosures of which are hereby incorporated by reference in their entirety for all purposes.

The present invention relates to a ducted wind turbine, particularly, but not exclusively, a floating ducted wind turbine for use in offshore environments. A semi-submersible support platform, wave energy capture apparatus and a torsional support bearing for use with or without the ducted wind turbine is also described.

In recent years there has been an increased demand for electricity generated by renewable energy sources such as wind turbines. With this a consequential increased demand for efficiency in such turbines has led to turbines being developed with increasingly longer blade lengths. For example, wind turbines having a blade length of over 80 metres, and an associated power generation capacity in the region of 8 MW exist.

However, it is generally accepted that the size and power generating capacity of such turbines cannot continue to increase. This is due to there being numerous factors which are likely to eventually place effective limitations on the size and power generating capacity of such turbines; for example, materials engineering may not continue to provide materials which are able to withstand the aerodynamic, dynamic and static forces placed upon such large structures; socio-political pressures may make the erection of such large turbines impossible; other logistical/manufacturing reasons may make such structures non-viable/too expensive.

Offshore wind, wave and tidal turbines have been developed with a view to addressing these and other issues; however, many such turbines have poor survivability prospects in the inherently harsh environmental conditions likely to be experienced during their power generating lifetime. Indeed, it is the largest amplitude waves and strongest winds that have the potential to generate the most electrical power in such devices; however, many known systems require to be shut down, parked or otherwise secured during such conditions to avoid being damaged.

According to a first aspect of the present invention there is provided a ducted wind turbine comprising:—
  at least a turbine rotor assembly adapted to extract kinetic energy from air flowing there past, the rotor assembly comprising a plurality of rotor blades having rotor tips at their outermost ends which define a rotor tip sweep circumference;
  a duct assembly at least partially surrounding said rotor tip sweep circumference;
  a base platform adapted to support the ducted wind turbine; and
  wherein the duct assembly is mounted on the base platform by way of a weathervane bearing arrangement such that the duct assembly may weathervane around the turbine rotor assembly in response to changes in wind direction.

The ducted wind turbine may comprise a base platform for flotation on water. Said base platform may comprise a semi-submersible base platform.

A ducting channel may be provided between a ducting inlet and a ducting outlet of the wind turbine assembly, each ducting inlet and outlet having a longitudinal axis. The ducting inlet and outlet may be arranged such that their respective longitudinal axes are substantially parallel yet vertically or laterally offset relative to one another. The ducting inlet and outlet may alternatively be arranged such that their respective longitudinal axes intersect with one another at a redirect angle α.

The redirect angle α may be between around 90 to 170 degrees.

The area of the ducting inlet and outlet may be substantially equal to one another in order to minimise compression or expansion of air flowing through the wind turbine.

The area of the ducting inlet may be greater than the area of the ducting outlet in order to create a ram effect on air passing through the turbine.

The area of the ducting inlet may be lesser than the area of the ducting outlet in order to create a diffuser effect on air passing through the turbine.

The ducting inlet and the ducting outlet may comprise a circular, ovoid, or rectangular shaped area.

The ducting channel may comprise at least a guide vane arrangement adapted to guide air flow through the ducting channel and into the turbine rotor assembly.

A plurality of turbine rotors in the turbine rotor assembly may be assembled on two sets of coaxial contrary rotating hubs such that a primary set of rotors rotating in one direction and a secondary set of rotors rotating in an opposite direction may be provided.

The inner surface of the ducting channel may be aerodynamically optimised to facilitate smooth flow of air flow therethrough with minimal energy losses.

The outer surface of the ducting channel may aerodynamically optimised to minimise structural loads and aerodynamic turbulence on the turbine and semi-submersible base platform while enhancing air flow and promoting lower pressure across the ducting outlet and adding momentum to flow exhausted from the turbine outlet in order to aid the turbine mass air flow and energy capture.

The wind turbine arrangement may be provided with a vertical stabiliser tail either integrated with or separated from yet connected to, the ducted wind turbine in order to facilitate said weathervane movement. The tail may comprise steerable control surfaces and/or trim tabs.

The semi-submersible base platform may comprise a delta wing shaped arrangement having a plurality of discrete flotation members extending downwardly therefrom.

The semi-submersible base platform may comprise four discrete flotation members, one being provided at or toward each corner of the semi-submersible base platform such that a fore flotation member, an aft flotation member and two flanking flotation members may be provided.

Each of the discrete flotation members may comprise a lower float member attached to the semi-submersible platform by way of a support strut having a small hull cross sectional area at the water surface in order to maximise the stability of the support provided.

The weathervane bearing arrangement may comprise a substantially circular load bearing plate and a corresponding substantially circular recess provided between the wind turbine arrangement and the semi-submersible base platform such that, in use, the duct assembly may weathervane around the turbine rotor assembly.

The weathervane bearing arrangement may further be provided with friction reducing means in order to facilitate loaded rotational movement of the duct assembly relative to the semi-submersible base platform in response to movements in the prevailing wind direction.

A plurality of wave energy absorbers may extend from an attachment point on the semi-submersible base platform to the water such that one end of each wave energy absorber may be directly or indirectly supported by the base platform and the other end may be supported by buoyant engagement with the water.

Said wave energy absorbers may extend rearward from a trailing edge of the semi-submersible base platform on either side of the turbine arrangement.

Said attachment points of the wave energy absorbers may be arranged progressively rearward on the semi-submersible platform such that, in use, a wave passing the wind turbine arrangement will progressively interact with the forward-most to rearmost wave energy absorbers in succession.

The wave energy absorbers may be provided with an energy flotation module for buoyant interaction with the water.

The energy flotation module may comprise a substantially semi-spherical flotation member provided at a distal end of a structural arm of the wave energy absorber.

The energy flotation module may comprise a combined monocoque structural arm and flotation chamber.

The wave energy absorbers may be attached to the semi-submersible platform by way of a torsional bearing arrangement comprising a first rotatable member, a second rotatable member in rotatable communication with the first rotatable member, and torsional resistance means provided between the first and second rotatable members such that when at least one of the rotatable members is rotated relative to the other rotatable member a torsional resistance to such movement is created between said rotatable members.

At least a water turbine arrangement may be supported below the water surface by the semi-submersible platform.

A diffuser arrangement adapted to improve air flow through the turbine rotor assembly may also be provided.

According to a second aspect of the present invention there is provided a semi-submersible support platform comprising:
- an upper support deck upon which items, machines, buildings, equipment or other items may be sited;
- a plurality of lower discrete flotation members;
- a plurality of corresponding support struts extending from each corner of the support deck to each corresponding flotation member, the support struts having a cross sectional area which is small relative to that of the flotation members in order to maximise the stability of the support provided thereby to the upper support deck;
- an anchoring arrangement provided at a leading corner of the support deck in order to allow the support platform to weathervane there around and to thereby create a fore flotation member, an aft floatation member and two flanking flotation members.

A weathervane bearing arrangement may be provided such that the duct assembly may weathervane with respect to the semi-submersible base platform in response to changes in prevailing wind direction.

The wind turbine assembly may comprise a ducted wind turbine.

The wind turbine assembly may comprise a ducted wind turbine having a ducting channel provided between a ducting inlet and a ducting outlet of the wind turbine assembly, each ducting inlet and outlet having a longitudinal axis. The ducting inlet and outlet may be arranged such that their respective longitudinal axes are substantially parallel yet vertically or laterally offset relative to one another. Alternatively, the ducting inlet and outlet may be arranged such that their respective longitudinal axes intersect with one another at a redirect angle $\alpha$.

The redirect angle $\alpha$ may be between around 90 to 170 degrees.

The upper support deck may be adapted to site a nuclear reactor facility.

The upper support deck may comprise a delta wing shaped arrangement.

A plurality of wave energy absorbers extending from an attachment point on the semi-submersible base platform to the water such that one end of each wave energy absorber is directly or indirectly supported by the base platform and the other end is supported by buoyant engagement with the water may be provided.

At least a water turbine arrangement supported below the water surface by the semi-submersible platform may be provided.

According to a third aspect of the present invention, there is provided wave energy capture apparatus comprising:
- a support platform providing an attachment and pivot point for the wave energy capture apparatus;
- an elongated arm member attached to the support platform, the elongated arm member comprising a monocoque buoyant float for buoyant interaction with a passing wave such that it may rotate around said pivot point in response to said passing wave.

According to a fourth aspect of the present invention, there is provided a torsional bearing mechanism comprising:
- a first rotatable member;
- a second rotatable member in rotatable communication with the first rotatable member; and
- torsional resistance means provided between the first and second rotatable members such that when at least one of the rotatable members is rotated relative to the other rotatable member a torsional resistance to such movement is created between said rotatable members.

The torsional resistance member may comprise a metallic or non-metallic rod.

Additional substantially non-torsional support members may be provided between the first and second rotatable members in order to structurally support said members during rotation relative to one another.

According to a fifth aspect of the present invention there is provided a latticework wind turbine tower comprising:
- an outer circumferential face;
- a corresponding inner circumferential face; and
- a plurality of cross brace structural members provided between the outer and inner circumferential faces.

The outer and or inner circumferential faces may comprise a plurality of curved or straight structural brace members.

The latticework turbine tower may comprise an aerodynamic covering provided over and between the structural brace members of the latticework.

Further features and advantages of the present invention will become apparent from the claims and the following description.

Embodiments of the present invention will now be described by way of example only, with reference to the following diagrams, in which.

Figure 1A:
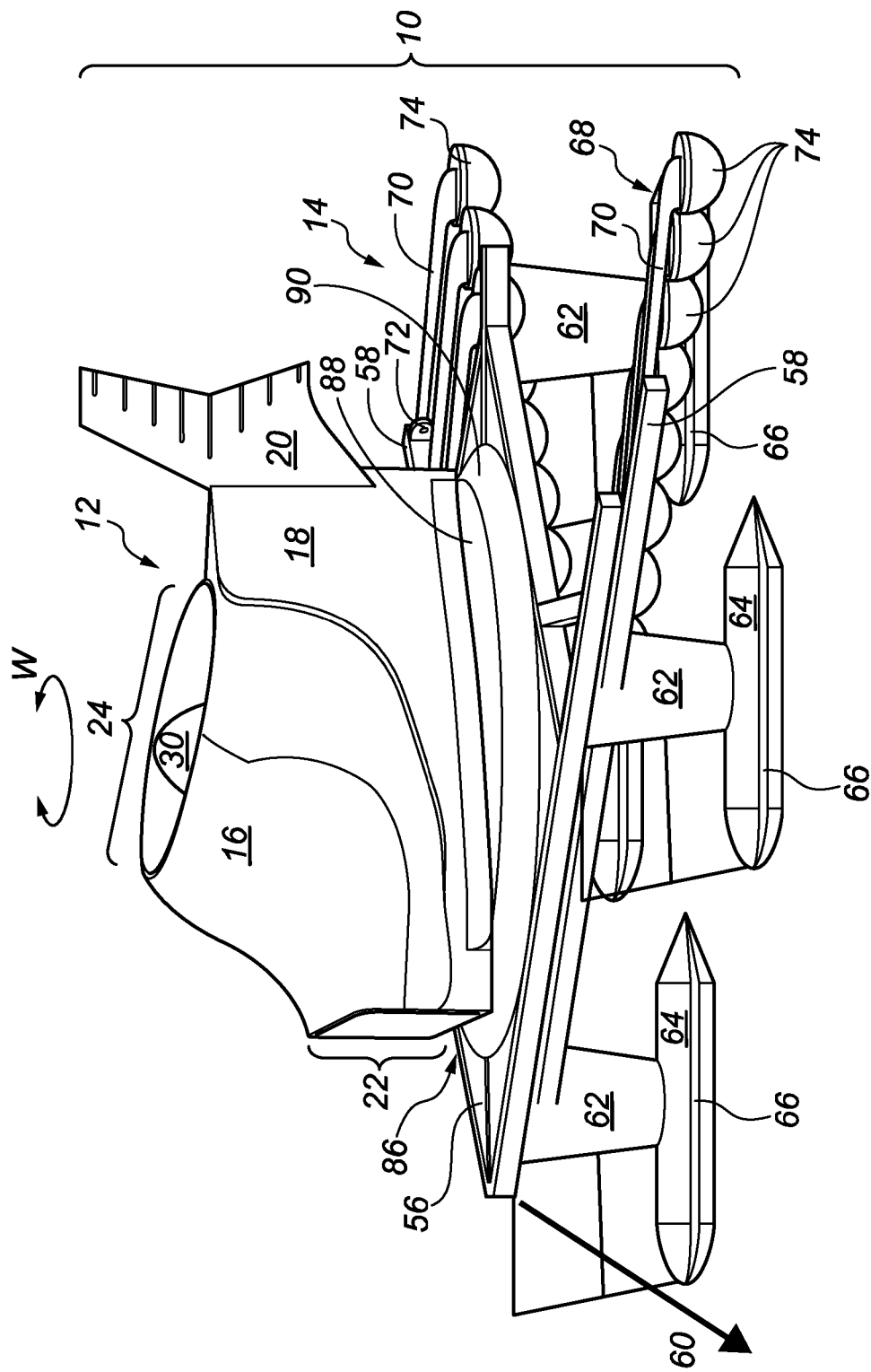
FIGS. 1A and 2 are schematic perspective side view illustrations of a ducted wind turbine mounted on an associated semi-submersible platform in accordance with a first embodiment of the invention.
Figure 1B:
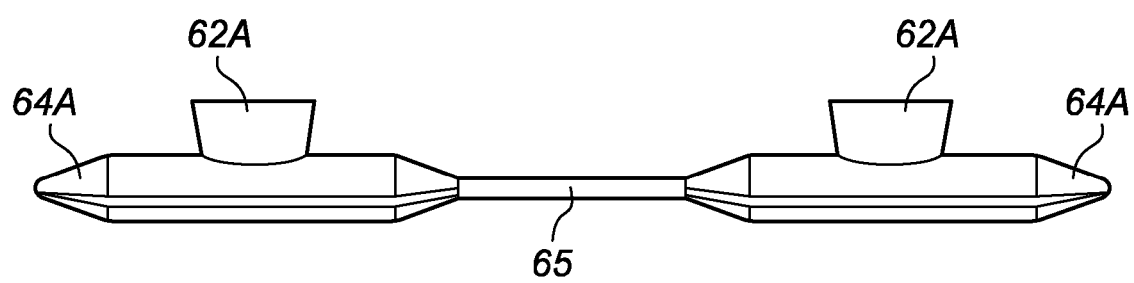
FIG. 1B is a schematic transverse illustration of an alternative linked floatation hull arrangement.
Figure 1C:
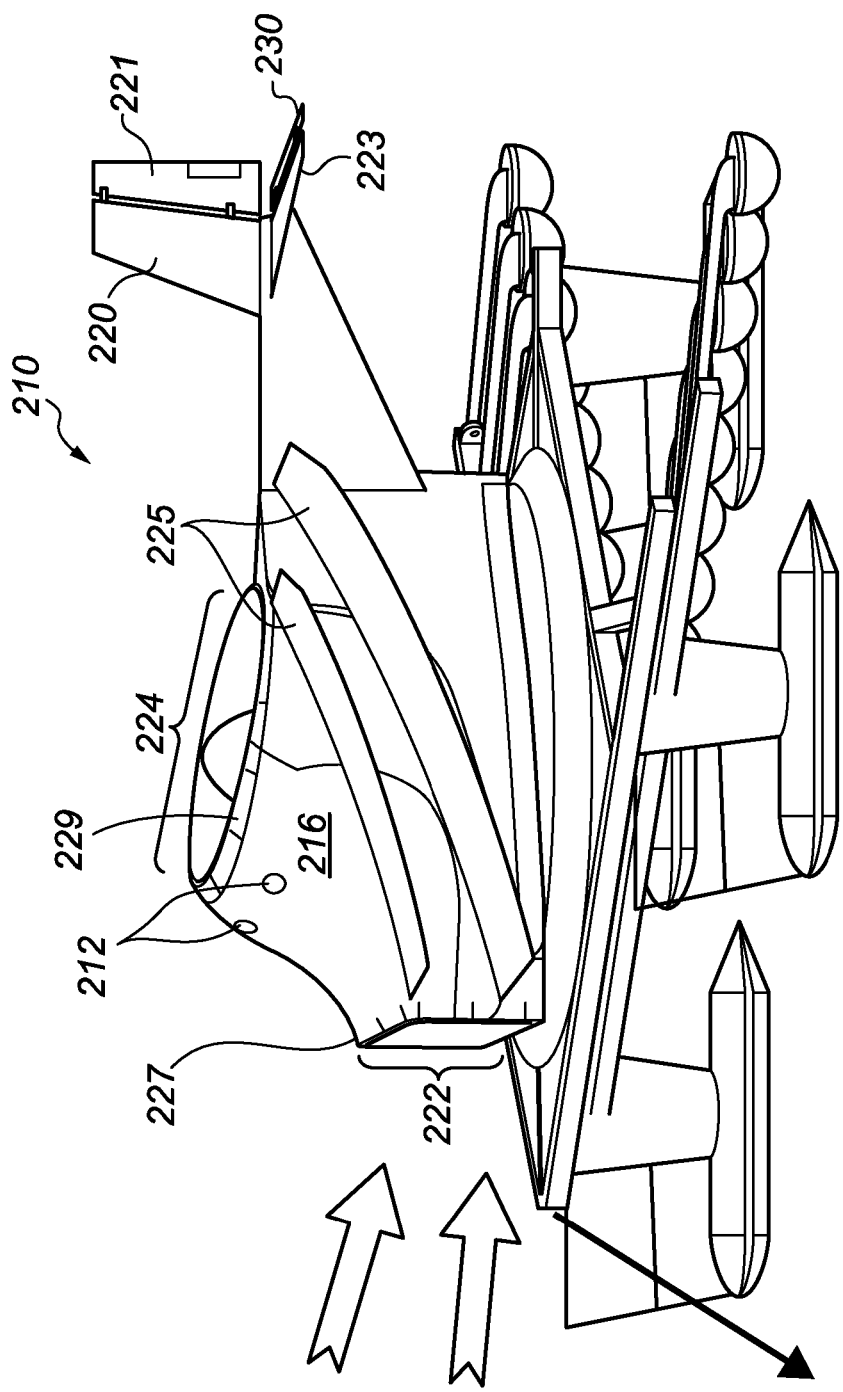
FIG. 1C is a schematic perspective side view illustration of a floating ducted wind turbine in accordance with a second embodiment of the invention.
Figure 2:
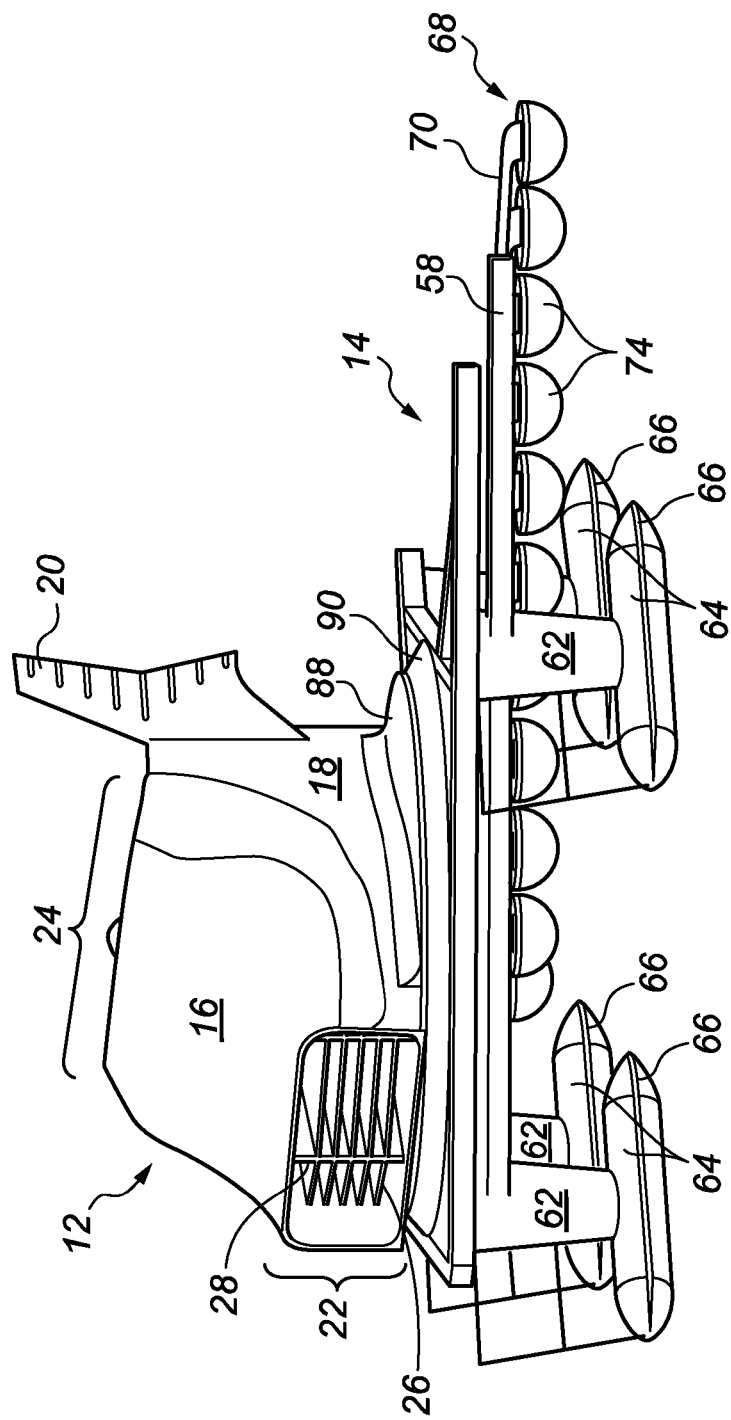
Figure 3A:
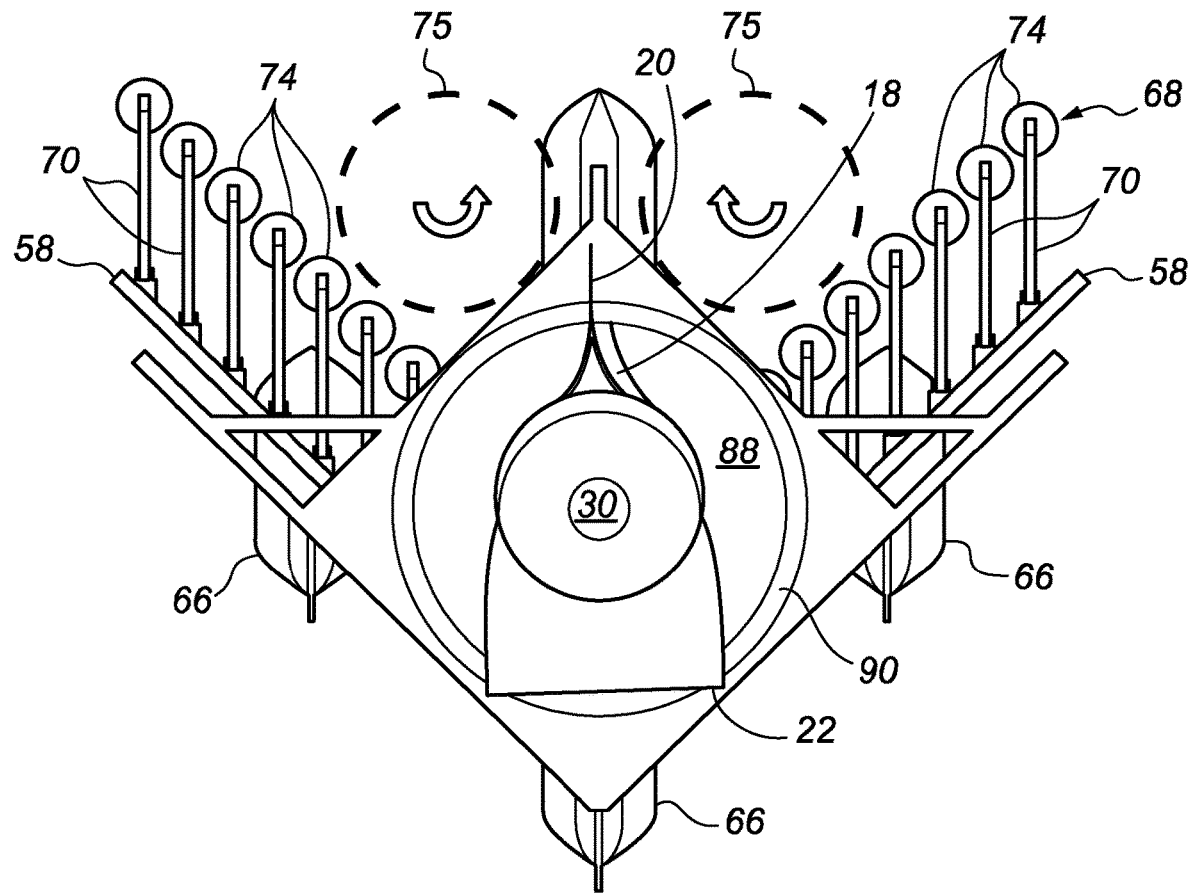
FIG. 3A is a schematic plan view illustration of the turbine of FIGS. 1A and 2.

With particular reference to FIGS. 1 to 3 an offshore power generating module generally designated 10 comprises a floating ducted wind turbine (DWT) generally designated 12 mounted upon a semi-submersible platform (SSP) generally designated 14.

The DWT 12 comprises a contoured and shaped outer cowl 16 which is aerodynamically contoured on its inner side to facilitate smooth flow of air flow therethrough with minimal energy loss, and aerodynamically contoured on its outer side to minimise structural loads and aerodynamic turbulence on the DWT 12 and the SSP 14 upon which it is mounted. Downstream from the cowl 16 is an intermediate empennage section 18 which tapers from the cowl 16 to an associated vertical stabiliser 20.

Several types and format of material may be utilised in order to form the cowl 16, empennage 18 and tail 20 section; however, examples include sail cloth, fibreglass, geodetic structures etc.

The outer cowl 16 gradually and aerodynamically tapers from a rectangular section inlet duct 22 at its in use front end to a circular section outlet duct 24 at its upper surface. Tapered cut-outs (not shown) may be provided in the side walls of the cowl 16 adjacent the inlet 22 in order to facilitate entry of any off-centred gusts encountered. As shown in FIG. 4, the inlet duct 22 is provided with a longitudinal axis L1 and the outlet duct 24 is provided with a longitudinal axis L2. In conforming from the rectangular shaped section adjacent inlet duct 22 to the circular shaped section adjacent outlet duct 24, the cowl 16 turns through a redirect angle α (FIG. 4) this being the angle between the two axes L1 and L2. In the embodiment illustrated this redirect angle α is in the region of 100 degrees; however, it may be far lesser or greater depending upon requirements.

Figure 4A:
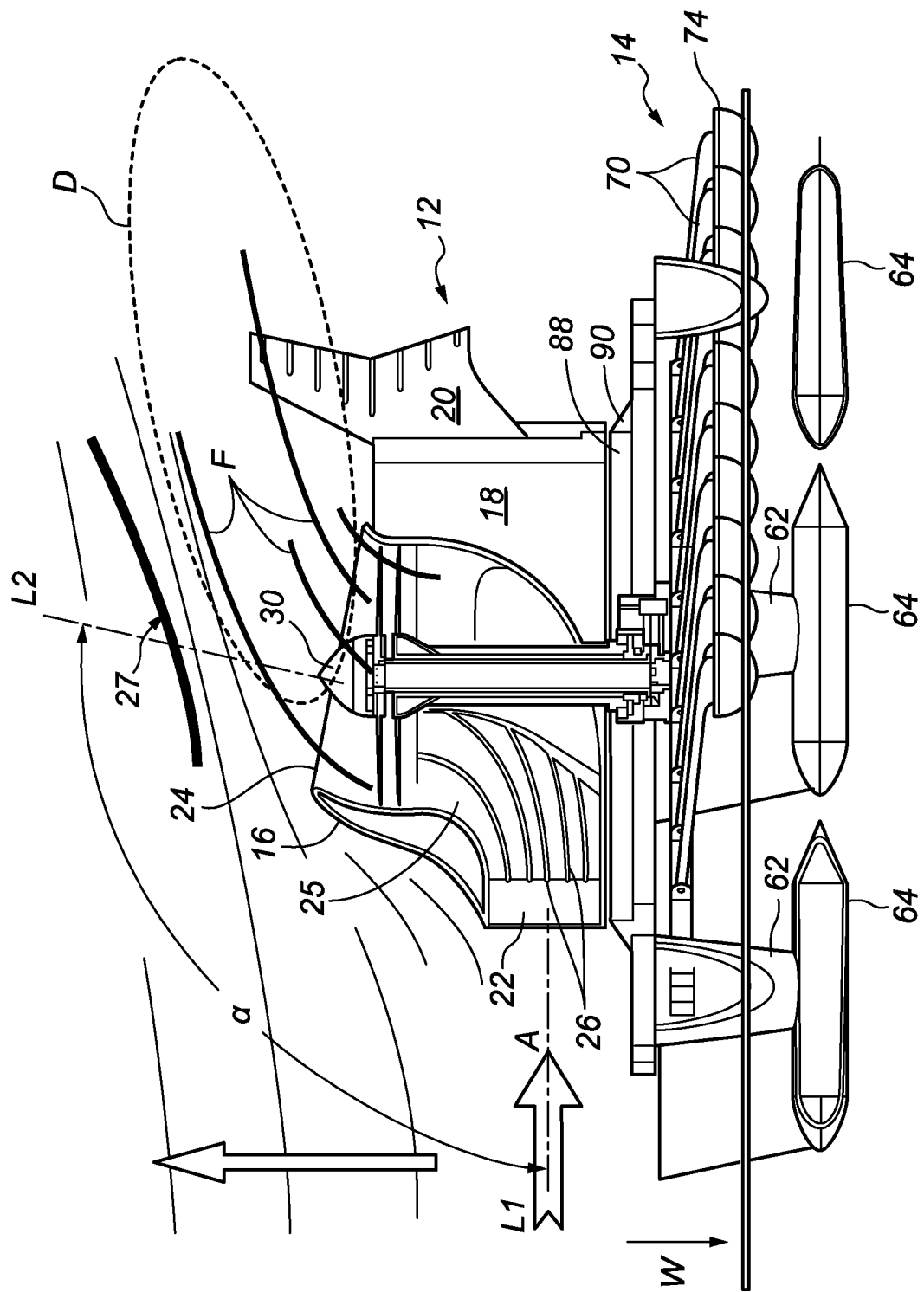
FIG. 4A is a transverse partial cross sectional schematic illustration of the turbine of FIGS. 1A and 2.
Figure 4B:
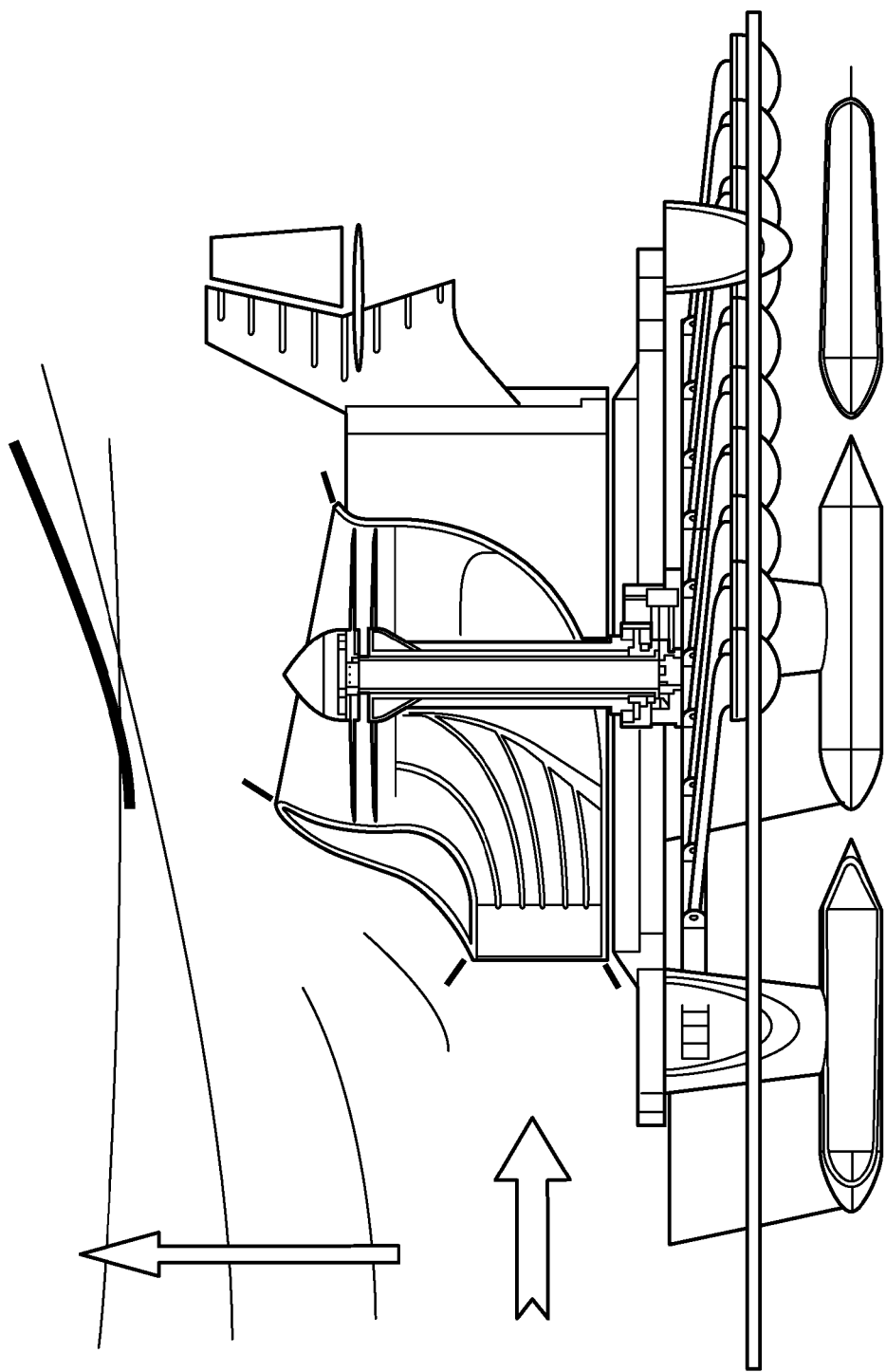
FIG. 4B is a transverse partial cross sectional schematic illustration of the turbine of FIG. 1C.

As best illustrated in FIGS. 2 and 4A, the internals of cowl 16 also comprises a series of horizontally arranged air flow guide vanes 26 and a central vertically arranged air flow baffle 28.

With particular reference to FIG. 4A, inside the DWT 12, a main air duct 25 is provided and the guide vanes 26 are gradually curved from the inlet longitudinal axis L1 toward the outlet longitudinal axis L2 in order to similarly direct the flow of air passing therethrough. The vertical separation distance between the guide vanes 26 also gradually increases as they progress from the inlet duct 22 toward the outlet duct 24 in order to promote smooth airflow and facilitate an even distribution of air toward the outlet 24. An optional diffuser wing 27 may be provided at a suitable distance above the DWT outlet 24 in order to advantageously interact with the airflow exhausted therefrom in order to maximise the efficiency of the apparatus (as represented by lines F in the area D in FIG. 4A). The upper surface of the diffuser wing 27 may also be provided with an array of photovoltaic cells in order to allow further energy capture from solar energy if desired.

Figure 5:
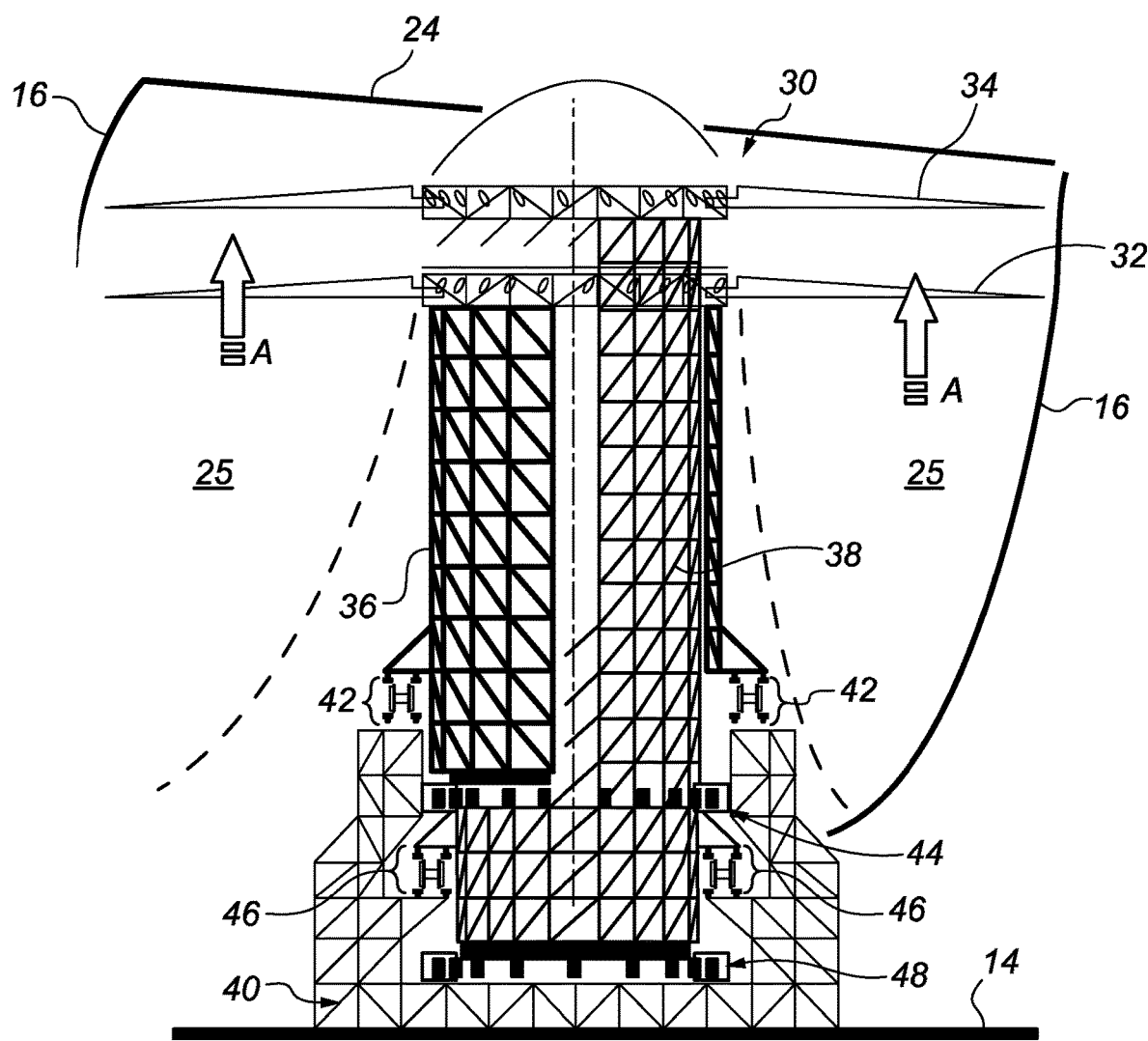
FIG. 5 is a more detailed schematic illustration of a turbine blade, hub and internal tower arrangement of the turbine of FIGS. 1A and 2.

A contra-rotating turbine assembly (CRTA) 30 projects into the main air duct 25. With reference to FIG. 5, the CRTA 30 includes a primary set of turbine blades 32 and a secondary set of turbine blades 34 which are arranged such that they are contra-rotating relative to one another. The primary blades 32 are mounted upon a primary tower 36 and the secondary blades 34 are mounted upon a secondary tower 38 which is coaxially surrounded by the primary tower 36 (the primary and secondary towers are shown in partial cut away section for illustrational purposes in FIG. 5). With the blade orientation illustrated in FIG. 5, the primary blades will rotate in the clockwise direction (when viewed from above) and the secondary blades will rotate in an anti-clockwise direction (when viewed from above) when the airflow A passing through the DWT 12 is imparted on them; however, these directions may be altered by changing the blade orientations as desired. Furthermore, an active blade pitch adjustment mechanism may be utilised if desired.

Figure 6:
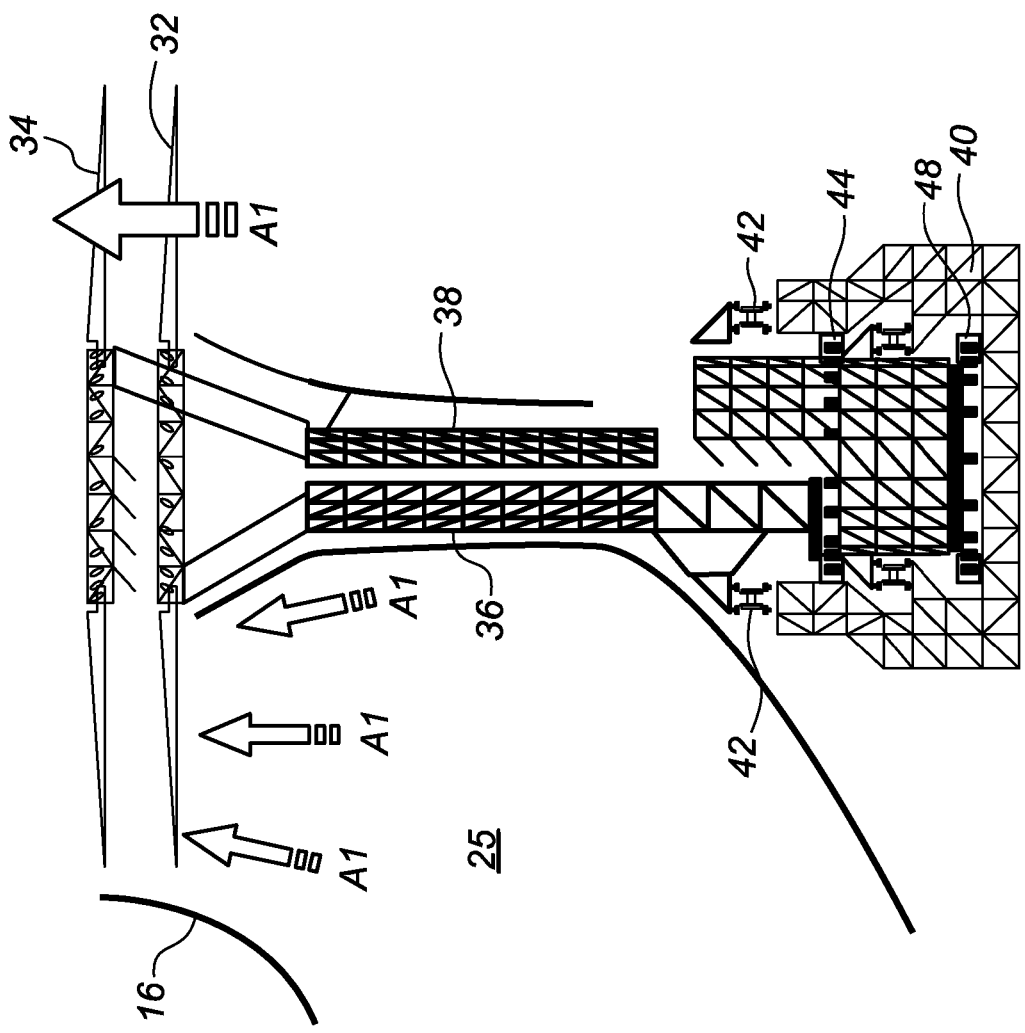
FIG. 6 is a more detailed schematic illustration of an alternative embodiment of the turbine where the internal tower profile has a narrowed cross section.

With reference to FIG. 6, in an alternative embodiment, the cross section of the main air duct 25 at or adjacent the CRTA 30 may comprise a narrowed section in order to provide altered flow dynamics represented by arrows A1 through the DWT 12.

In the embodiments illustrated by FIGS. 5 and 6, the primary and secondary sets of blades 32, 34 are not rotationally mounted on their respective towers 36, 38. Instead the sets of blades 32, 34 are rigidly mounted to their respective towers 36, 38 and the towers 36, 38 are rotationally mounted on their respective bases at a power deck module 40. However, in an alternative embodiment, the reverse can be achieved by locating the bearings and electricity generators (discussed subsequently) at the same height as the turbine blades atop the towers if required.

In the embodiment illustrated in FIGS. 5 and 6, the towers 36, 38 comprise a latticework space frame structure having curved members arranged so as to provide a circular outer cross section; however, any alternative structure may be utilised as appropriate.

Figure 8A:
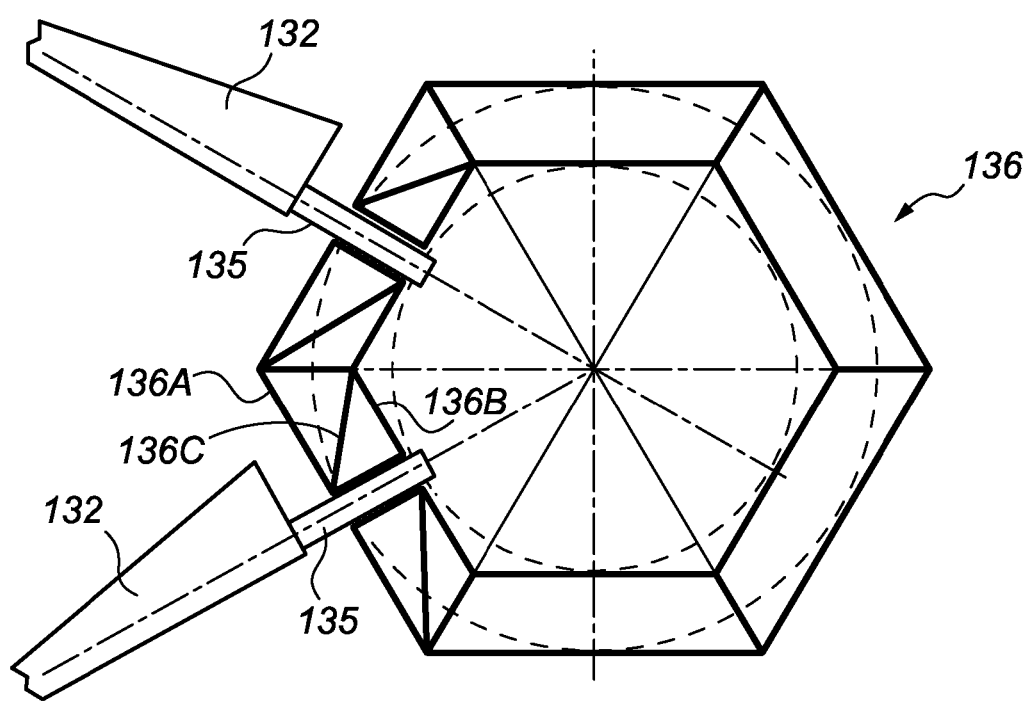
FIG. 8A is a schematic plan view illustration showing a turbine tower in accordance with an alternative embodiment where two example turbine blade formations are illustrated attached thereto.

With reference to FIG. 8A, in an alternative embodiment a turbine tower 136 (which may be a primary or secondary turbine tower) comprises a multi-faceted latticework space frame structure. In the embodiment illustrated the cross section of the structure is shown as being hexagonal; however, any number of straight sides may be provided in order to form the required 360 degree formation of the tower. Each cell of the latticework comprises an outer face strut 136A, inner face strut 136B, and diagonal cross bracing strut 136C. Where for example the lengths of the outer face struts 136A are in the region of 6 metres around 40 flat faces may be provided around the circumference of the tower 136 in order to provide a 360 degree assembly.

Figure 8B:
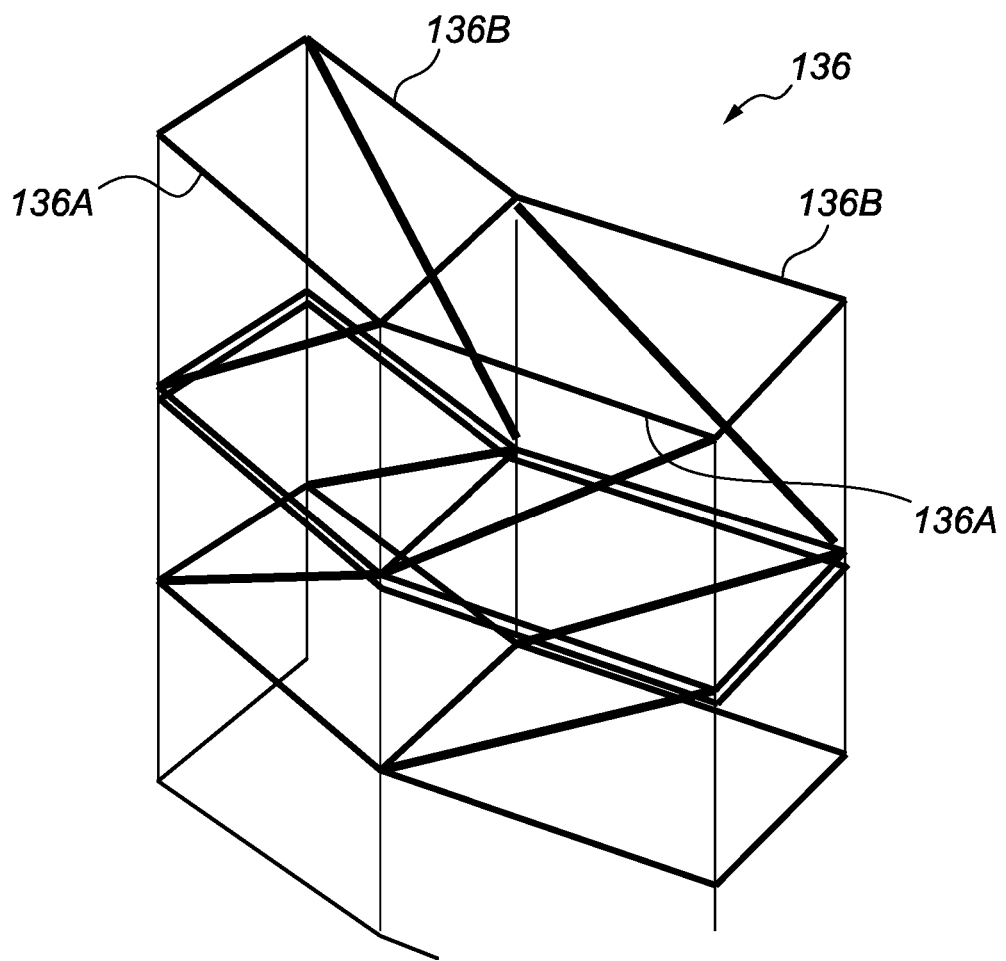
FIG. 8B is a schematic perspective view illustration showing a portion of the turbine tower of FIG. 8A.

With reference to FIG. 8B, each cell of latticework is mounted upon and adjacent to similarly arranged cells in order to provide a double walled multi-faceted latticework tower.

Figure 8C:
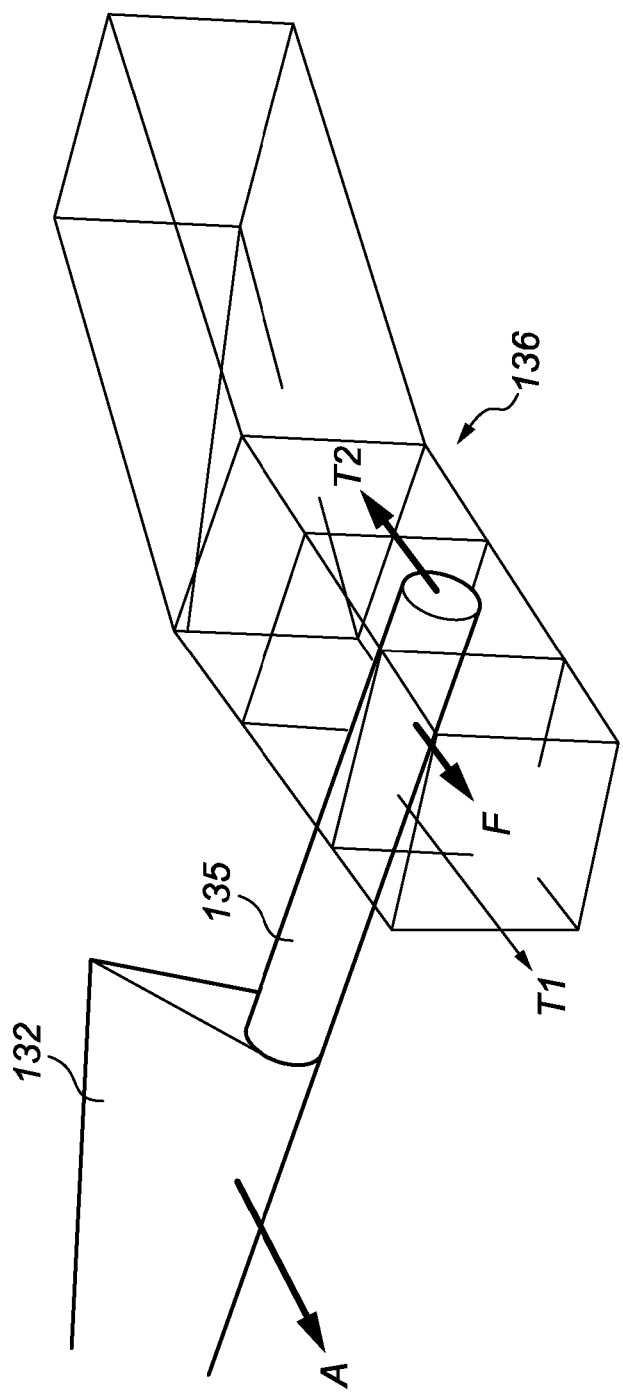
FIG. 8C is schematic perspective view illustration showing an upper portion of the turbine tower of FIG. 8A in greater detail.

With reference to FIG. 8C, turbine blades 132 are attached to the cells of the tower 136 by way of one or more blade root rods 135. In use, when the turbine blade is driven in the direction indicated by arrow A in FIG. 8C the blade root rod 135 creates a coupled force T1 and T2 and imparts a rotational force F on the tower 136 which in turn generates electrical power by driving electricity generating modules (not shown).

The lattice framework arrangement described with reference to FIGS. 8A to 8C minimises the primary and/or secondary tower overall mass, material and construction costs.

The structures referred to above may be provided with a drag reducing aerodynamic skin if required in order to minimise disruption to the air flowing there past within the main duct of the DWT 12.

Referring again to FIGS. 5 and 6, the power deck module 40 comprises a primary set of roller bearing assemblies 42 and a primary electricity generator 44 which are associated with the primary tower and hence the primary blades 32. Likewise, for the secondary tower 38 the power deck module 40 also comprises a secondary set of roller bearing assemblies 46 and a secondary electricity generator 48 which are associated with the secondary tower and hence the secondary blades 34.

Figure 7A:
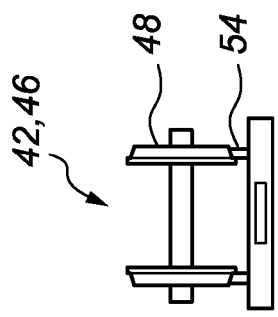
FIG. 7A is a more detailed schematic front illustration of a railway axle and associated railings of FIGS. 5 and 6.
Figure 7B:
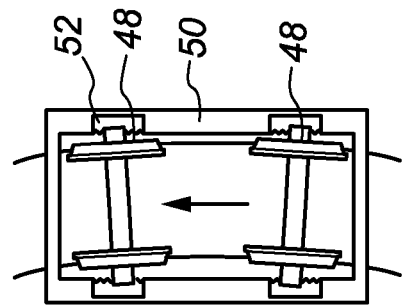
FIG. 7B is a plan view schematic illustration of the arrangement in FIG. 7A.

With reference to FIGS. 7A and 7B, the roller bearing assemblies 42, 46 comprise a pair of wheel sets 48 which are located within a bogey arrangement 50 by resilient spring/damper arrangements 52 in order to allow the wheel sets 48 to follow a circular curved section of associated track 54.

The electricity generators 44, 48 comprise any suitable generator such as for example a large diameter permanent magnet and coil generator.

With reference to FIG. 1A, the SSP 14 comprises a square planar upper support deck 56 having a pair of trailing wings 58 extending rearward from opposing corners of the deck 56 in order to form a resultant delta-wing shape when anchored by a tether diagrammatically represented by arrow 60 in FIG. 1A.

Figure 3B:
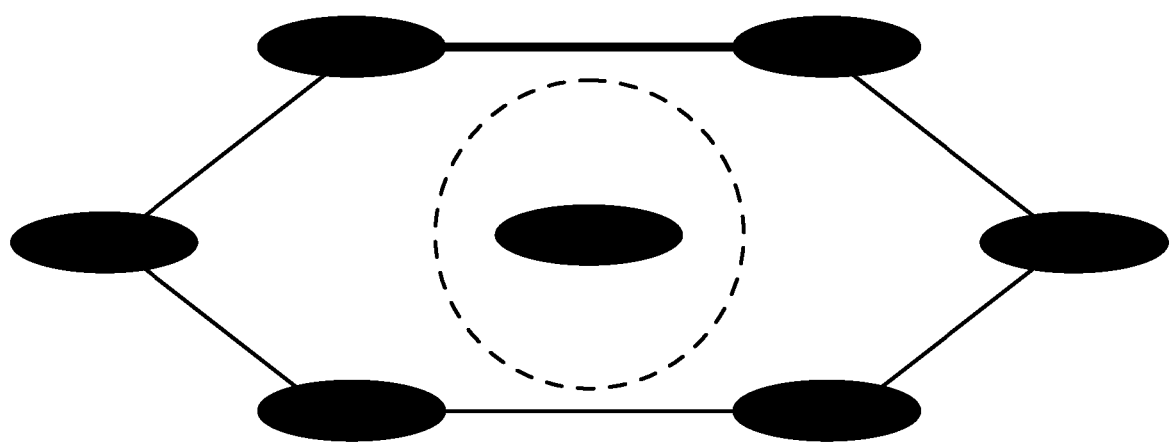
FIGS. 3B and 3C are schematic plan views of example alternatively shaped support platform and flotation arrangements.
Figure 3C:
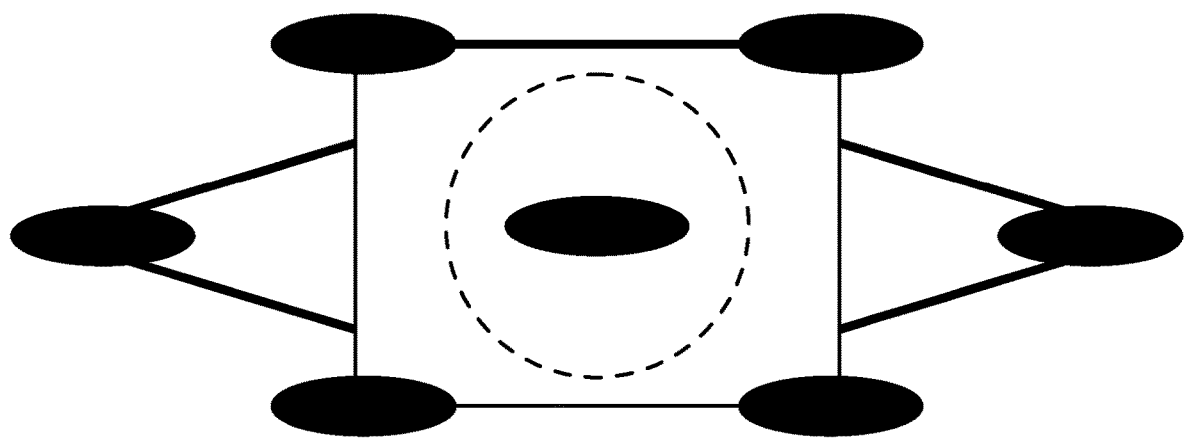

Note that in alternative embodiments illustrated by FIGS. 3B and 3C, the SSP 14 and any associated flotation arrangement may be arranged with alternatively shaped profiles depending upon requirements.

Returning to the arrangement of FIG. 1A, four hull support struts 62 project downwardly from the support deck 56 toward corresponding flotation hulls 64 provided with heave plates 66. The relative dimensions of the support struts 62 and the dimensions/buoyancy of the flotation hulls 64 are dimensioned such that the support struts 62 have a relatively (in relation to the buoyancy provided by the hulls 64) low cross sectional area at the point at which they are likely to meet the waterline in order to maximise the stability of the support provided in accordance with "Small Waterplane Area Twin Hull" (SWATH) theory. A typical expected mean position of the waterline is indicated as W in FIG. 4A. More or less than four hull support struts may be provided depending upon requirements.

With reference to FIG. 1B, in an alternative embodiment, the floatation hulls 64A may be linked to one another by link 65 and connected to the SSP 14 by one or more supports struts 62A as desired. The link 65 illustrated in FIG. 1B is shown in-line with the longitudinal axes of the floatation hulls 64A; however, in an alternative embodiment (not shown) the link may instead be linked perpendicular to the linked floatation hull longitudinal axes.

Extending rearward from the trailing wings 58 are several wave energy absorbers 68. These are of the same length as one another so that their ends effectively mirror the delta-wing shape of the trailing wings 58 for purposes which will be described subsequently. The wave energy absorbers 68 comprise elongated arms 70 which are connected to the trailing wings 58 at one end by a pivot joint 72 and provided with a semi-spherical flotation arrangement 74 at the other end for engagement with the water surface/passing waves.

Figure 9A:
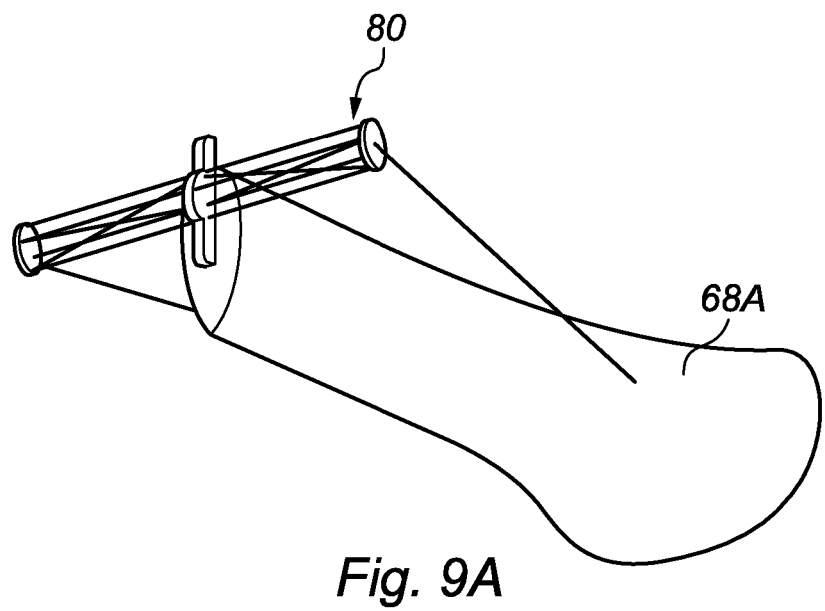
FIG. 9A is a lower perspective schematic illustration of an alternative wave energy absorber attached to a torsional bearing arrangement.
Figure 9B:
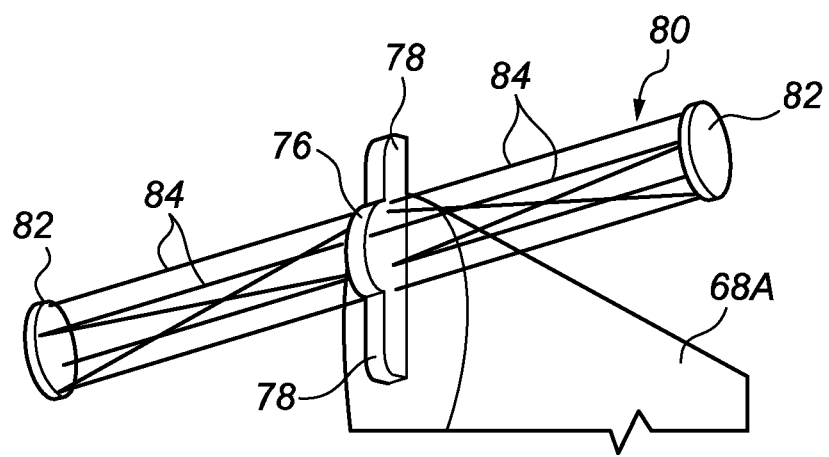
FIG. 9B is a more detailed illustration of the torsional bearing arrangement of FIG. 9A.
Figure 10:
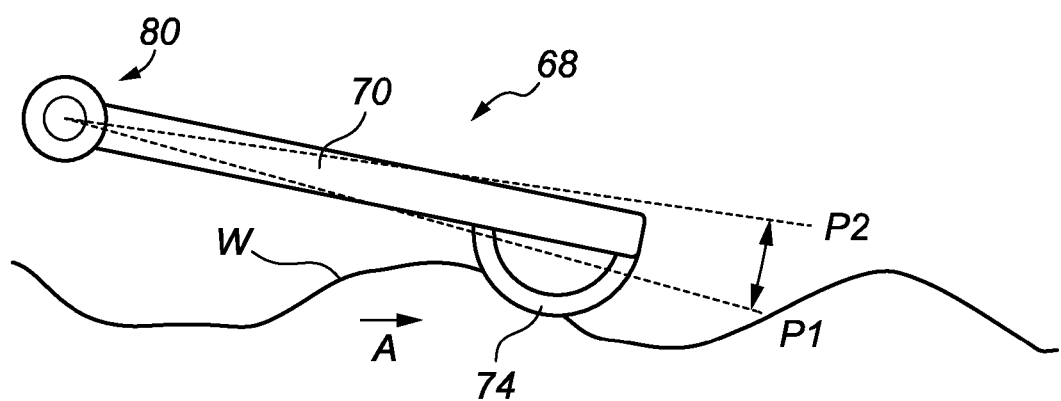
FIG. 10 is a schematic diagram illustrating the basic principle of operation of the wave energy absorber.
Figure 11:
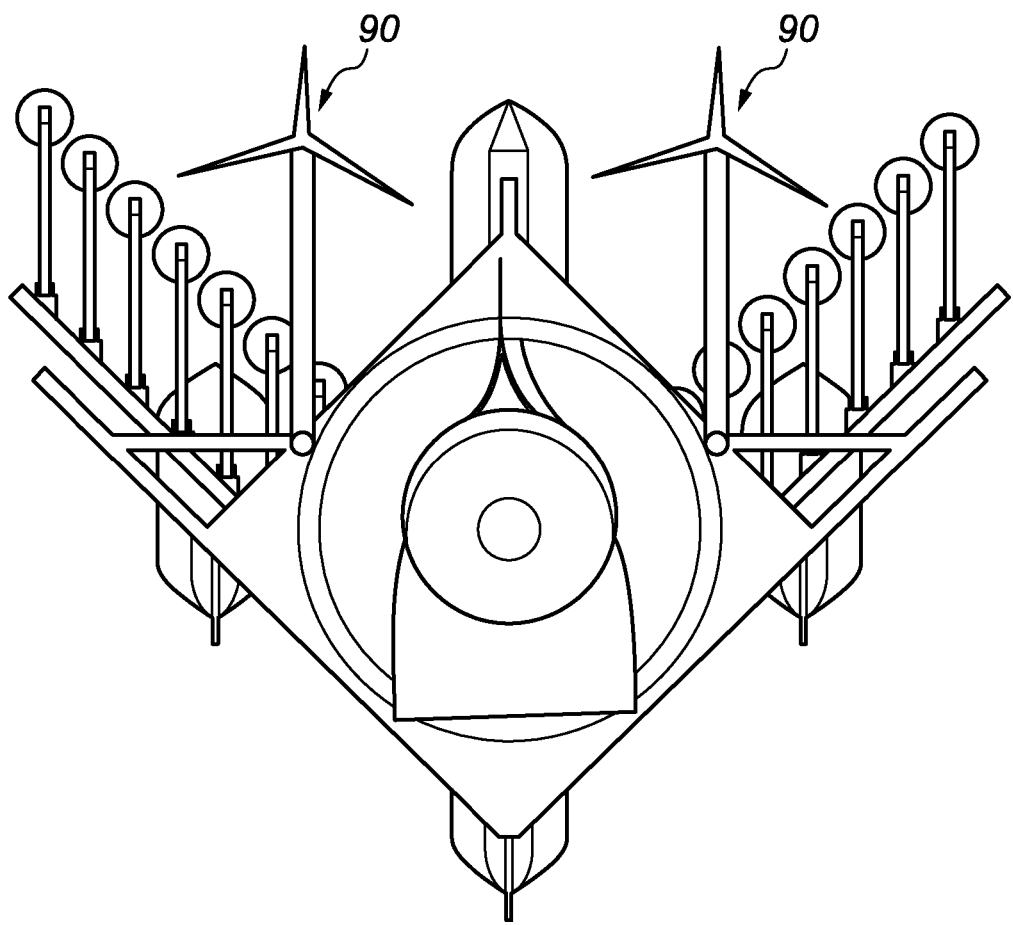
FIG. 11 is a perspective illustration of the arrangement in FIG. 3 where a pair of additional inclined axis water turbine arrangements extend from the trailing edge of the arrangement.

With reference to FIGS. 9A and 9B, in an alternative embodiment, the wave energy absorbers comprise a combined monocoque structural arm and flotation chamber arrangement 68A having a torsional bearing 80 and power take off connections 78 at one end thereof. The torsional bearing 80 is provided to allow pivoting attachment of the flotation chamber 68A to the SSP 14 and comprises a central disc 76 which is rigidly connected to the flotation chamber 68A, a pair of end discs 82 which are rigidly connected to an appropriate anchoring point on the SSP 14, and torsional/supporting rods 84 which connect the end discs 82 to the central disc 76.

Referring to FIGS. 1 to 3, the DWT 12 is attached to the SPP 14 by way of a rotating table arrangement generally designated 86 and comprising a circular load bearing plate 88 attached to the underside of the DWT 14 and a corresponding circular recess 90 provided on upper deck 56 of the SSP 14. Friction reducing means such as e.g. wheel and track arrangements similar to the roller bearing assemblies 42, 46 described above, or e.g. ball bearing based arrangements provide the DWT 12 with the ability to weathervane upon the SSP 14 as indicated by arrow W in response to changes in the prevailing wind direction.

In the described embodiments the height of the overall combined DWT and SSP structure might be in the region of around 200 to 800 metres with the wing span from tip to tip also being in the region of around 200 to 800 metres; however, the reader will appreciate that these dimensions may be greatly altered to suit the predicted forces, power generating requirements, deployment location etc. as required.

Figure 12A:
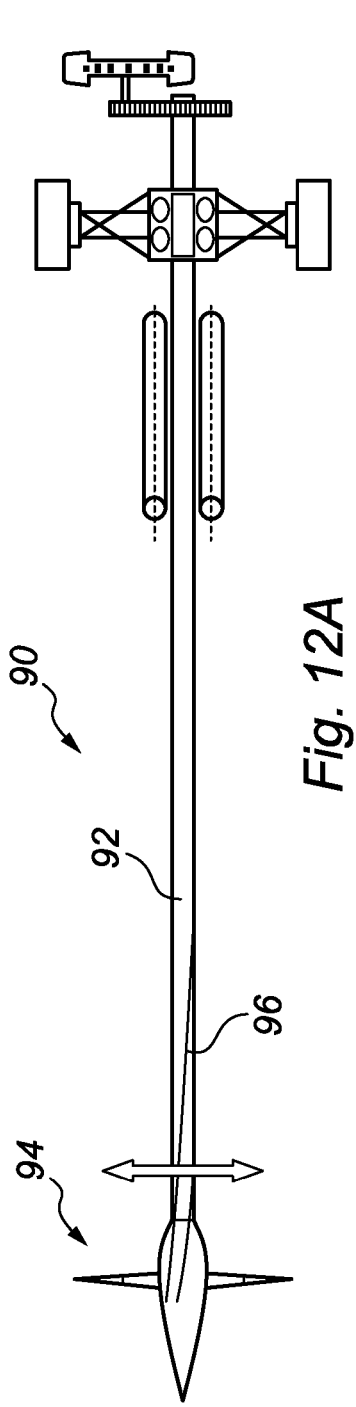
FIG. 12A is a more detailed plan view schematic illustration of an inclined axis water turbine arrangement and its associated components.
Figure 12B:
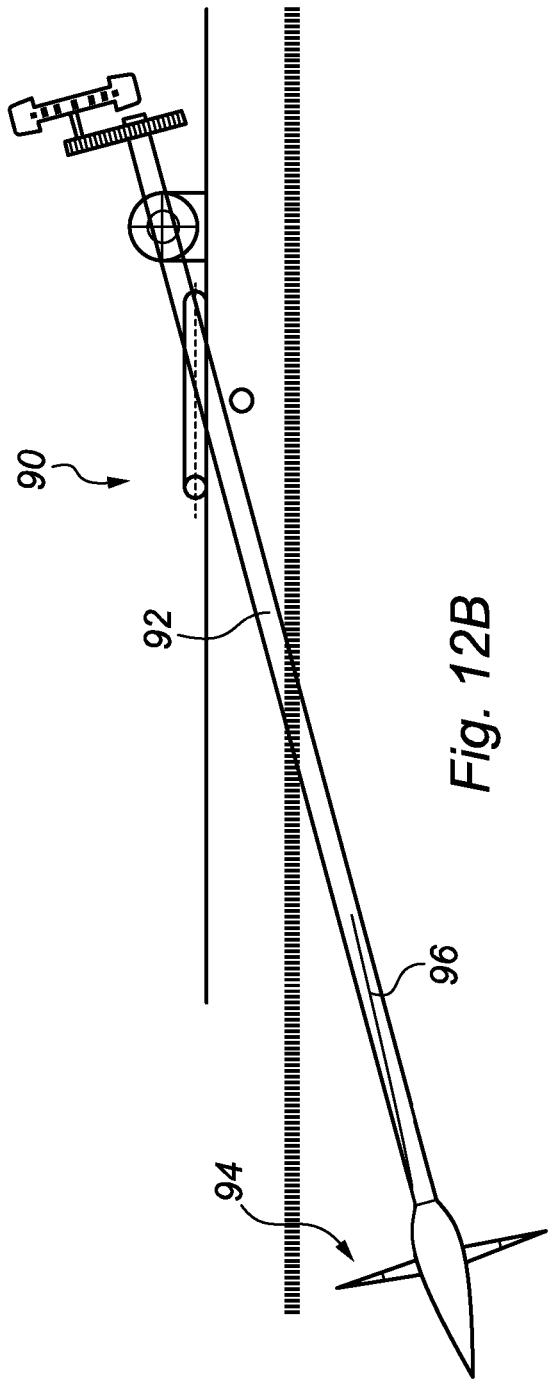
FIG. 12B is a transverse schematic illustration of the arrangement shown in FIG. 12A.

The offshore power generation module 10 may also be provided with tidal turbine arrangements such as vertical "across" axis turbines (as diagrammatically illustrated by 75 in FIG. 3) horizontal "across" axis turbines, or axial flow turbines (as diagrammatically illustrated by 90 in FIGS. 12 and 12A, 12B.

With reference to FIGS. 12A and 12B, a combined turbine a main turbine shaft 92 is angled into the water from the SSP 14 and is provided with a turbine arrangement 94 at its lower end. The main shaft 92 and/or turbine 94 are buoyant such that any heave loads are minimised and such that radial bearing loads are reduced at the hub/pivot point. This buoyancy also supports the turbine mass and reduces any bending moment applied to the main shaft in order to reduce fatigue loads resulting from the shaft rotation. The flow into the turbine is also augmented into the turbine by fairings 96.

In use, the offshore power generating module 10 is first towed into its desired waterborne operating location either by a suitable vessel or by a self-propelling motor etc. This location may be at shallow or deep water sea, rivers, estuaries, or on inland water features such as lakes, and inlets etc.

Once at a suitable location, the module 10 is tethered there by any suitable anchoring arrangement as diagrammatically represented by arrow 60 in FIG. 1A. In such a condition the prevailing water current imparted on the SSP 14 will naturally cause it to weathervane around its tether such that the SSP 14 will naturally align with the prevailing water current.

As a prevailing wind (which may be in a different direction from the prevailing water current) is imparted upon the DWT 14 the force of said wind will interact with the intermediate empennage section 18 and vertical stabiliser 20 in order to naturally cause the front of the DWT 14 cowl 16 to weathervane on its bearing table 86 around the turbine module into the wind as illustrated by arrow W in FIG. 1A.

In this way the SSP 14 will always naturally be aligned with the prevailing water current and the DWT 12 will always naturally be aligned with the prevailing wind direction.

Alternatively, or additionally, the orientation of the DWT 12 cowl 16 relative to the prevailing wind direction may be controlled actively using a forward looking sensing system. An example such system is LIDAR where LIDAR sensors are provided on or around the cowl 16. In such an arrangement, sensing data is processed by on board or remote computer control systems and sends control responses to electro-mechanical, pneumatic, magnetic and/or hydraulic actuators in order to either directly drive the wind turbine cowl 16 into the wind or cause the components of the tail 20 to deflect and therefore cause the cowl 16 to rotate into the wind.

Such control systems may in some circumstances allow the cowl 16 to respond more quickly to wind direction changes than might be the case with passive weathervane control alone. The above control systems may be used in addition or independently to control or adjust any aerodynamic or other system anywhere within the system.

The provision of LIDAR sensors in conjunction with such a control system also allows oncoming wave and swell sea states and profiles which may interface with the power generating module 10 to be detected. When such expected conditions are detected this information is input to the system such that all responses of any components can be optimised to ensure a maximum efficiency of energy harvesting from the environment by the system's various components. For example, the resistance to movement of the wave energy absorbers can be increased when high magnitude waves are expected. This may also enhance platform stability and reduce mechanical and electrical stresses throughout the system as a whole which in turn may help to extend the lifetime of the system and reduce maintenance requirements.

Such control systems and software may be pre-programmed or contain learning algorithms. Control input requirements may be generated on board the power generating module 10, at an operator control centre or from demand side inputs (for example electricity grids or energy companies).

With reference to FIG. 4A, with the duct inlet 22 of the DWT 12 facing directly into any prevailing wind, incoming airflow A will enter the main air duct 25 of the DWT through the inlet 22, travel along and up the internal main duct 25 under the guidance of the guide vanes 26, and will be directed upwards towards the turbine arrangement 30.

With reference to FIG. 5, when such ducted airflow A meets the primary set of turbine blades 32 it will impart a clockwise (when viewed from above) rotational force thereupon. Since the primary blades 32 are mounted on primary tower 36 which itself is mounted upon wheel bearings 42 the primary tower 36 will rotate under the action of said rotational force. As this occurs electrical power will be generated at the primary generator 44.

In a similar fashion, once the stream of air has passed the primary set of turbine blades 32 it will impart upon the secondary set of turbine blades 34 and hence impart a rotational force thereon. However, since the secondary blades 34 are orientated in the opposite sense from the primary blades 32 this will be an anti-clockwise (when viewed from above) rotation force. Since the secondary blades 34 are mounted on secondary tower 38 which itself is mounted upon wheel bearings 46 the secondary tower 38 will rotate under the action of said anti-clockwise rotational force. As this occurs electrical power will also be generated at the secondary generator 48.

Throughout the above described operations, it will be appreciated that the duct or cowl assembly 16 is free to weathervane around the turbine arrangement without any rotation of the turbine rotor assembly as a whole being required. This creates a useful mechanical dissociation between the angular orientation of the duct or cowl assembly 16 from the angular orientation of the remaining components of the power generating module 10.

The previously described contra-rotation of the primary blades 32 relative to the secondary blades 34 means that any torque generated by one set of blades is, in the most part, cancelled out by any torque created by the other set of blades. This results in minimum residual torque being applied to the SSP 14 upon which the DWT 12 is mounted.

The process of harvesting energy from the water upon which the SSP 14 is stationed will also now be described. For clarity this will be described with reference to an example passing wave and separately with reference to an example prevailing water current; however, it will be appreciated that the module is capable of harvesting energy from the wind, waves and water current simultaneously.

As an example wave approaches the module 10, its first useful interaction with it will be with the semi-spherical flotation arrangements 74 of the two foremost wave energy absorbers (e.g. the two wave energy absorbers nearest to the centreline of the SSP 14). With reference to FIG. 9 as wave front W travelling in direction A interacts with the float 74 the float's inherent buoyancy will rotate the float 74 and its attached arm 70 upwards away from its neutral position (where its longitudinal axis is in position P1) towards its loaded position (where its longitudinal axis is in position P2). During such rotation away from the neutral position P1, the buoyant force of the float 74 acts to apply a torsional loading force to the torsional bearing 80 and to usefully move any power take off arrangements attached to the power take off connections 78 thereof and hence generate power. This loading of the torsional bearing 80 essentially stores a portion of the kinetic energy harvested from the upward motion of the wave energy absorber 68 as potential energy within the torsional bearing 80. The reluctance of the SSP heave plates 66 to vertical movement within the water column also provides a reaction force against which the floats 74 act during this up-stroking loading phase.

Once the float 74 has reached the crest of the wave front W the arm 70 will be in position P2 and the torsional bearing 80 can be considered as fully loaded for that wave front W. At this point, the wave front W begins to fall away and no longer fully support the weight of the wave energy absorber 68 such that the wave energy absorber 68 will begin to ride back down the crest of the passing wave front W. Whilst doing so, the potential energy stored within the torsional bearing 80 is released thereby facilitating said down stroking of the wave energy absorber 68.

The above described transfer of kinetic energy from the up-stroking wave energy absorber 68, to temporarily stored potential energy in the torsional bearing 80 and then back to kinetic energy in the down-stroking wave energy absorber 68 is (with the exception of power usefully extracted by the energy take offs) substantially energy neutral; however, this provides a strong support bearing having the desired pivoting abilities with minimal frictional losses.

Since wave profiles can generally be approximated as a mathematical sine wave, the movement profile and hence electrical power generation profile of each wave energy absorber 68 can also be generally approximated to a mathematical sine wave. As a given wave passes each wave energy absorber 68 additional sine wave energy profiles are created. This creates a set of phase-shifted energy pulses which helps to smooth the profile of the resultant energy captured by the system. This effect is further enhanced by the plurality of wave energy absorbers 68 being arranged in a delta-wing arrangement since this results in each new wave front generating sine wave energy profiles at the forward wave energy absorbers 68 whilst older passing wave fronts are still interacting with more rearward wave energy absorbers 68.

The wave energy absorbers 68 may be actively controlled in order to adjust the buoyancy stiffness of each individual absorber arrangement as it is displaced upwards or downwards in response to wave and swell formations passing by the power generating module 10.

The SSP 14 itself provides a very stable structure for the various components described since it is always aligned well with any prevailing water current, has a low and centralised centre of gravity, benefits from inherent geometric stabilities and makes use of the small water plane area struts/flotations and heave plates.

The energy simultaneously harvested by the multiple aforementioned arrangements can be accumulated by mechanical or electrical means such that conditioned and smoothed energy pulses may be fed into the electricity grid as appropriate. Example mechanical accumulators might include pneumatic or hydraulic pressure accumulators or springs or flywheels etc. Example electrical accumulators might include e.g. capacitors or batteries etc. Alternatively/additionally, the harvested energy could be utilised on-board the module 10 to useful effect such as in the production of gas (e.g. hydrogen or oxygen) or in desalination/electrolysis operations etc.

In addition to those previously described, the present invention also has the advantage of allowing many moving and complex mechanical parts to remain well above the water level and away from the splash zone. This results in greater expected longevity due to reduced wear and tear.

Furthermore, it will be appreciated that the described invention has the advantage of being configurable at virtually any scale whilst also being well suited to being provided as either a singular unit or in a field of several units.

Although particular embodiments of the invention have been disclosed herein in detail, this has been done by way of example and for the purposes of illustration only. The aforementioned embodiments are not intended to be limiting with respect to the scope of the appended claims.

It is contemplated by the inventors that various substitutions, alterations, and modifications may be made to the invention without departing from the spirit and scope of the invention as defined by the claims. For example:

Although the embodiments described within the present application primarily refer to a floating arrangement provided on a body of water, the invention is not limited to being provided on a floating platform but instead may be provided on a variety of possible foundations such as on land or ice whether the invention be directly attached to such foundations (in e.g. the case of a turbine directly resting on a piece of land) or installed on vehicles or buildings (in e.g. the case of a turbine installed atop a building).

The invention may be provided with control systems for maintaining the correct level of buoyancy in the floating platform and/or assimilating environmental and demand side data signals such that the turbine operational efficiency and output is maximised. This may be achieved through pre-programmed controls, learning control algorithms or any other appropriate control strategy as required.

In an alternative embodiment illustrated with reference to FIG. 1C, the power generating module 210 may be provided with LIDAR sensors 212 in order to provide the LIDAR capability previously mentioned. Furthermore, the vertical stabiliser 220 is provided with a corresponding rudder control surface 221, a horizontal stabiliser 223 and corresponding elevator control surfaces 230. These surfaces allow the orientation of the duct or cowl 216 to be controlled in a similar fashion to the way in which an aircraft tail is able to control the yaw angle and angle of attack to the oncoming airflow. Trim-tabs may also be provided to trim out any forces required to maintain the cowl 216 in the optimal orientation with respect to the prevailing wind direction.

The embodiment illustrated in FIG. 1C is also provided with external aerodynamic vanes 225 which further facilitate aerodynamically efficient airflow over and around the cowl 216. Leading edge aerodynamic flaps 227 are provided adjacent the inlet duct 222 and corresponding trailing edge aerodynamic flaps 229 are provided adjacent the outlet duct 224. The flaps 227, 229 may be controlled and deployed by an on-board or remote controlled system in response to any forward looking wind or sea state sensor information (such as the aforementioned information obtained from the LIDAR system).

The invention claimed is:

1. A ducted wind turbine for flotation on a body of water comprising:
   a turbine rotor assembly adapted to extract kinetic energy from air flowing there past, the rotor assembly comprising a plurality of rotor blades having rotor tips at their outermost ends which define a rotor tip sweep circumference;

a duct assembly at least partially surrounding said rotor tip sweep circumference;

a semi-submersible base platform comprising a delta wing shaped arrangement having a plurality of discrete flotation hulls extending downwardly therefrom;

fore, aft, and two flanking flotation hulls, one flotation hull being provided at or toward each corner of the semi-submersible base platform, the flotation hulls extending downwardly from the delta wing shaped arrangement and adapted to support the ducted wind turbine on a body of water;

wherein the duct assembly is mounted on the base platform by way of a weathervane bearing arrangement such that the duct assembly weathervanes around the turbine rotor assembly in response to changes in wind direction; and a ducting channel being provided between a ducting inlet and a ducting outlet of the duct assembly, each of the ducting inlet and outlet having a longitudinal axis and wherein the ducting inlet and outlet are arranged such that their respective longitudinal axes intersect with one another at a redirect angle α and wherein the plurality of turbine rotor blades in the turbine rotor assembly are assembled on sets of coaxial contrary rotating hubs such that at least a primary set of rotor blades rotating in one direction and at least a secondary set of rotor blades rotating in an opposite direction are provided.

2. A ducted wind turbine according to claim 1, wherein the redirect angle α is between around 90 to 170 degrees.

3. A ducted wind turbine according to claim 1, wherein a rotor plane area of a first set of rotor blades and a rotor plane area of a final set of rotor blades are substantially equal to one another in order to minimize compression or expansion of air flowing through the wind turbine.

4. A ducted wind turbine according to claim 1, wherein the area of the ducting inlet is greater than the area of the rotor plane area of the first set of rotor blades in order to create a ram effect on air passing through the turbine.

5. A ducted wind turbine according to claim 1, wherein the area of the ducting inlet is lesser than the rotor plane area of a final set of rotor blades in order to create a diffuser effect on air passing through the turbine.

6. A ducted wind turbine according to claim 1, wherein the ducting inlet and the ducting outlet each comprise a circular, ovoid or rectangular shaped area.

7. A ducted wind turbine according to claim 1, wherein the ducting channel comprises at least a guide vane arrangement adapted to guide air flow through the ducting channel and into the turbine rotor assembly.

8. A ducted wind turbine according to claim 1, wherein the inner surface of the ducting channel is aerodynamically optimised to facilitate smooth flow of air flow therethrough with minimal energy losses.

9. A ducted wind turbine according to claim 1, wherein the outer surface of the ducting channel is aerodynamically optimised to minimise structural loads and aerodynamic turbulence on the turbine and semi-submersible base platform while enhancing air flow and promoting lower pressure across the ducting outlet and adding momentum to flow exhausted from the turbine outlet in order to aid the turbine mass air flow and energy capture.

10. A ducted wind turbine according to claim 1, wherein the wind turbine arrangement is provided with a vertical stabiliser tail, either integrated with or separated from yet connected to, the ducted wind turbine in order to facilitate said weathervane movement.

11. A ducted wind turbine according to claim 10, wherein the tail comprises steerable control surfaces and/or trim tabs.

12. A ducted wind turbine according to claim 1, wherein each of the flotation hulls comprises a lower float member attached to the semi-submersible platform by way of a support strut having a small hull cross sectional area at the water surface in order to maximise the stability of the support provided.

13. A ducted wind turbine according to claim 1, wherein the weathervane bearing arrangement comprises a substantially circular load bearing plate and a corresponding substantially circular recess provided between the wind turbine arrangement and the semi-submersible base platform such that, in use, the duct assembly weathervanes around the turbine rotor assembly.

14. A ducted wind turbine according to claim 13, wherein the weathervane bearing arrangement is further provided with friction reducing means in order to facilitate loaded rotational movement of the duct assembly relative to the semi-submersible base platform in response to movements in the prevailing wind direction.

15. A ducted wind turbine according to claim 1, wherein a plurality of wave energy absorbers extend from an attachment point on the semi-submersible base platform to the water such that one end of each wave energy absorber is directly or indirectly supported by the base platform and the other end is supported by buoyant engagement with the water.

16. A ducted wind turbine arrangement according to claim 15, wherein said wave energy absorbers extend rearward from a trailing edge of the semi-submersible base platform on either side of the turbine arrangement.

17. A ducted wind turbine arrangement according to claim 15, wherein said attachment points of the wave energy absorbers are arranged progressively rearward on the semi-submersible platform such that, in use, a wave passing the wind turbine arrangement will progressively interact with the forwardmost to rearmost wave energy absorbers in succession.

18. A ducted wind turbine arrangement according to claim 15, wherein the wave energy absorbers are provided with an energy flotation module for buoyant interaction with the water.

19. A ducted wind turbine arrangement according to claim 18, wherein the energy flotation module comprises a substantially semi-spherical flotation member provided at a distal end of a structural arm of the wave energy absorber.

20. A ducted wind turbine arrangement according to claim 18, wherein the energy flotation module comprises a combined monocoque structural arm and flotation chamber.

21. A ducted wind turbine arrangement according to claim 15, wherein the wave energy absorbers are attached to the semi-submersible platform by way of a torsional bearing arrangement comprising a first rotatable member, a second rotatable member in rotatable communication with the first rotatable member, and torsional resistance means provided between the first and second rotatable members such that when at least one of the rotatable members is rotated relative to the other rotatable member a torsional resistance to such movement is created between said rotatable members.

22. A ducted wind turbine arrangement according to claim 1, further comprising at least a water turbine arrangement supported below the water surface by the semi-submersible platform.

23. A ducted wind turbine according to claim 1, further comprising a diffuser arrangement adapted to improve air flow through the turbine rotor assembly.

\* \* \* \* \*